US012237090B2

(12) United States Patent
Thomsen, III

(10) Patent No.: US 12,237,090 B2
(45) Date of Patent: Feb. 25, 2025

(54) RADIATION SHIELDING ARTICLES COATED WITH LOW AND HIGH Z MATERIALS

(71) Applicant: UNITED STATES OF AMERICA AS REPRESENTED BY THE ADMINISTRATOR OF NASA, Washington, DC (US)

(72) Inventor: Donald L. Thomsen, III, Yorktown, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 432 days.

(21) Appl. No.: 17/569,035

(22) Filed: Jan. 5, 2022

(65) Prior Publication Data

US 2023/0215590 A1 Jul. 6, 2023

(51) Int. Cl.

| | |
|---|---|
| ***G21F 1/12*** | (2006.01) |
| ***C23C 4/08*** | (2016.01) |
| ***C23C 4/134*** | (2016.01) |
| ***G21F 3/02*** | (2006.01) |

(52) U.S. Cl.
CPC ................ *G21F 1/125* (2013.01); *C23C 4/08* (2013.01); *C23C 4/134* (2016.01); *G21F 3/02* (2013.01)

(58) Field of Classification Search
CPC ............... G21F 1/12; G21F 1/125; G21F 1/08
See application file for complete search history.

(56) References Cited

U.S. PATENT DOCUMENTS

2009/0272921 A1* 11/2009 Ballsieper ................. G21F 1/12 250/515.1
2018/0294063 A1* 10/2018 Thomsen, III .......... H02S 20/00

OTHER PUBLICATIONS

Zefeng Li et al., "High-efficiency, Flexibility and Lead-free X-ray Shielding Multilayered Polymer Composites: Layered Structure Design and Shielding Mechanism," Scientific Reports (2021), Nature Portfolio, pp. 1-13.

* cited by examiner

*Primary Examiner* — David E Smith
(74) *Attorney, Agent, or Firm* — Matthew R. Osenga; Shawn P. Gorman; Robin W. Edwards

(57) ABSTRACT

Described herein are articles composed of coatings with improved gamma radiation shielding and physical properties. In one aspect, the article is composed of a coating, where the coating includes a first layer composed of a first Z grade material, a second layer composed of a second Z grade material, and a third layer composed of a third Z grade material, wherein the atomic number of the first Z grade material and the third Z grade material is less than the atomic number of the second Z grade material. In one aspect, the substrate of the article is a textile. Methods for making the articles described herein are also provided.

20 Claims, 4 Drawing Sheets

RADIATION SHIELDING ARTICLES COATED WITH LOW AND HIGH Z MATERIALS

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Atomic number (Z) graded radiation shielding enables gamma radiation protection from sources typically found at medical facilities and doctor's offices. Z-graded radiation shielding improves ionizing dose protection from gamma radiation sources by an order of magnitude, when compared to standard lead shielding. The atomic number z-shielding approach supports the development of radiation protection equipment for medical professionals, technicians, and patients. The atomic number z-shielding approach innovates the medical industries radiation shielding materials by surpassing the performance of lead for radiation protection and improves the environmental handling for radiation shielding by removing the need for lead.

A significant problem in the medical industry is improving radiation shielding of personnel protective equipment in order to reduce the weight needed for equivalent lead radiation protection. Currently, lead-filled aprons are used in the medical industry. In order to reduce the weight or thickness of shielding with the same radiation protection requirements, the shielding effectiveness must improve. The standard for shielding uses lead as a standard thickness of 0.35 mm for gamma radiation protection in the medical apron industry. Apron garments are made with lead filled elastomeric sheets encased in polymeric fabrics. These apron garments, however, are heavy based on typical lead shielding mass requirements and are bulky due to the added elastomeric resin with additional polymeric fabrics. Furthermore, these lead shielding aprons have environmental safety concerns for disposal and typically have a recycling requirement to prevent lead from contaminating the environment through waste streams. Lead filled elastomeric resins have typical filler weight fractions of 20-30% maximum before the loss of elastomeric properties and strength. This constraint increases parasitic weight for the shielding performance. What is needed, therefore, are improvements that address one or more of these and/or other deficiencies in the art.

BRIEF SUMMARY

Described herein are articles with Z grade material. Articles may be composed of coatings improved gamma radiation shielding and physical properties. In one aspect, an article is composed of a coating, where the coating includes a first layer composed of a first Z grade material, a second layer composed of a second Z grade material, and a third layer composed of a third Z grade material, wherein the atomic number of the first Z grade material and the third Z grade material is less than the atomic number of the second Z grade material. In one aspect, a substrate of the article may comprise or wholly consist of a textile. Methods for making the articles described herein are also provided.

These and other features, advantages, and objects of the present invention will be further understood and appreciated by those skilled in the art by reference to the following specification, claims, and appended drawings.

DETAILED DESCRIPTION OF THE INVENTION

Figure 1:
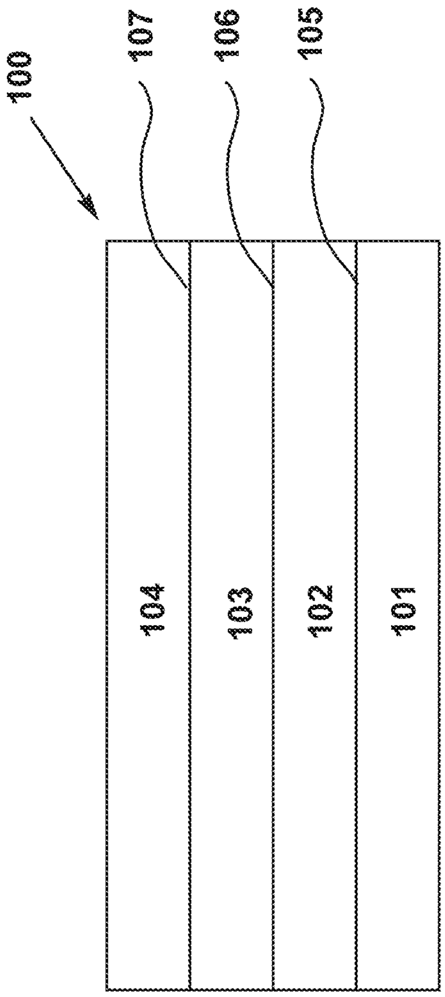
FIG. 1 depicts an exemplary article described herein.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of" Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a solvent" include, but are not limited to, mixtures or combinations of two or more such solvents, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to conduct the methods of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

As used herein, the terms “optional” or “optionally” means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Radiation Shielding Articles

Described herein are articles composed of coatings with improved gamma radiation shielding and physical properties. In one aspect, the article comprises a substrate having a first surface and a coating. In certain embodiments, the coatings have a first layer comprising a first Z grade material that is adjacent to the first surface of the substrate. The first layer, in turn, may have a first surface that is adjacent to a second layer comprising a second Z grade material. The second layer may, in turn, have a first surface that is adjacent to a third layer comprising a third Z grade material. In certain implementations, the atomic number of the first Z grade material and the atomic number of the third Z grade material are both less than the atomic number of the second Z grade material.

Referring to FIG. 1, the article 100 has a substrate 101, a first layer 102, a second layer 103, and a third layer 104. The layers of the coating are adjacent to (i.e., in contact with) one another at the surface of (i.e., interface) of each layer. These are depicted as 105, 106, and 107 in FIG. 1.

The substrate can be any material that can receive the coating where it is desirable to reduce the exposure of radiation or shield radiation. In one aspect, the substrate may comprise, or alternatively wholly consist of, is a textile. In one aspect, the substrate can be a woven or non-woven textile. In another aspect, the textile can be composed of nylon, polyethylene, polyester, or cotton, as examples. For example, the substrate may be Nomex® or Kevlar®. In one aspect, the textile has high heat resistance, which will facilitate the application of the Z grade materials on the textile. In one aspect, the textile is a fabric or component of an article of clothing. Using the methods described herein, it is possible to produce shape shielding garments. In one aspect, direct sewing of a metal coated fabrics to form articles of clothing, such as shirts, vests, jackets, pants, and skirts is useful feature of the coated textiles described herein.

In another aspect, the substrate can include shields for nuclear reactors or piping for radioactive fluids, protective clothing for nuclear hazardous waste handlers or astronauts, and spacecraft instrumentation or electronic enclosures. Shielding may be applicable to electron or gamma ray applications. Spacecraft applications range from primary shielding of electronics and instrument sensors to secondary shielding applications for instruments with specific additional radiation shielding requirements.

Figure 2:
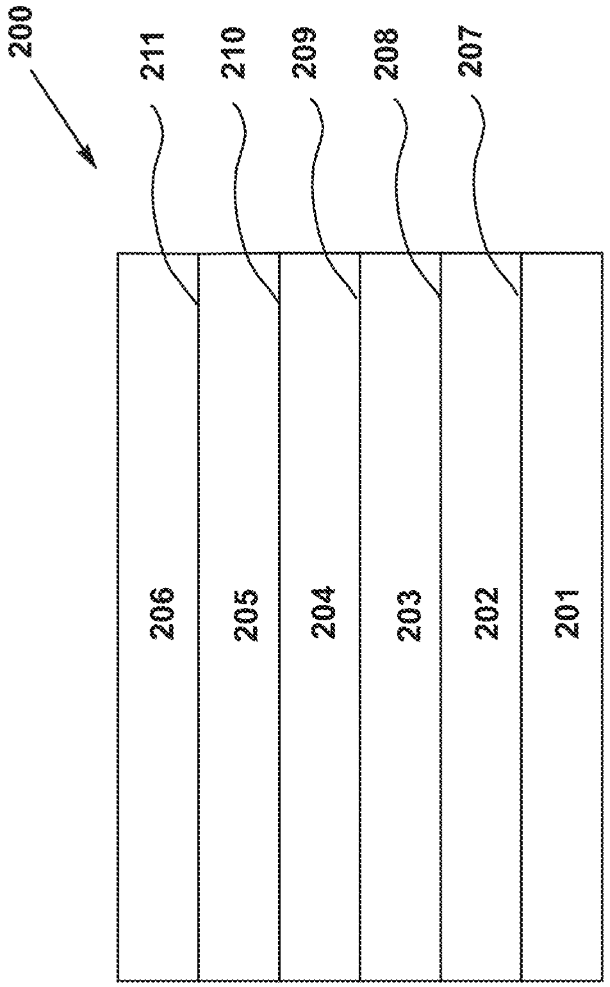
FIG. 2 depicts an exemplary article described herein.

FIG. 1 depicts a coating composed of three layers of Z grade materials adjacent to one another; however, other configurations are possible. FIG. 2 depicts a stacked system of substrates with Z grade materials positioned between each substrate. Referring to FIG. 2, article 200 is composed of substrates 201, 203, and 205 and the first, second, and third layers 202, 204, and 206, respectively. The substrates and layers of Z grade materials are adjacent to (i.e., in contact with) one another at the surface of (i.e., interface) of each layer. These are depicted as 207-211 in FIG. 2. In one embodiment, the article comprises:

- a first substrate having a first surface;
- a first layer comprising a first Z grade material adjacent to the first surface of the first substrate, wherein the first layer has a first surface;
- a second substrate adjacent to the first surface of the first layer, wherein the second substrate has a first surface;
- a second layer comprising a second Z grade material adjacent to the first surface of the second substrate, wherein the second layer has a first surface;
- a third substrate adjacent to the first surface of the second layer, wherein the third substrate has a first surface; and
- a third layer comprising a third Z grade material adjacent to the first surface of the third substrate, In one such implementation, the atomic number of the first Z grade material and the atomic number of the third Z grade material may both be less than the atomic number of the second Z grade material.

In certain aspects, prior to applying the Z grade material(s) to the substrate, the substrate can be pre-treated. For example, when the substrate is a textile, a resin such as, for example, an elastomeric resin, can be applied to the textile in order to reduce the chance of the coating composed of Z grade materials being removed in the event when the textile is exposed to fatigue (e.g., wrinkling, sharp folding, etc.).

The selection of the Z grade materials can vary depending upon the application of the articles and the degree of radiation shielding. The atomic number of the first Z grade material and the third Z grade material is less than the atomic number of the second Z grade material. In one aspect, the first Z grade material and the third Z grade material may comprise and/or are the same material. In another aspect, the first Z grade material and the third Z grade material are different materials.

In one aspect, the first Z grade material and the third Z grade material comprises aluminum, titanium, copper, vanadium, steel, tin, antimony, or any combination thereof. In another aspect, the first Z grade material and the third Z grade material comprises an alloy of aluminum, an alloy of titanium, an alloy of vanadium, an alloy of copper, an alloy of steel, an alloy of tin, or an alloy of antimony. In one aspect, the first Z grade material and the third Z grade material is a titanium alloy such as, for example, Ti6Al4V, which is a commercially available alloy. In another aspect, the first Z grade material is Ti5Al2.5Sn, which is also a commercially available alloy. In one aspect, the first Z grade material and the third Z grade material comprises titanium.

In one aspect, the second Z grade material comprises one or more of: tantalum, bismuth, tungsten, lead, or any combination thereof. In another aspect, the second Z grade material comprises an alloy of tantalum, an alloy of bismuth, an alloy of tungsten, or an alloy of lead. In another aspect, the second Z grade material comprises a bismuth tin alloy. In another aspect, the first Z grade material and the third Z grade material comprises titanium and the third Z grade material comprises tantalum or bismuth.

The thickness of each layer of Z grade material can vary. In one aspect, the first layer, second layer, and third layer independently have a thickness of from about 0.05 mm to about 0.50 mm, or about 0.05 mm, 0.10 mm, 0.15 mm, 0.20 mm, 0.25 mm, 0.30 mm, 0.35 mm, 0.40 mm, 0.45 mm, or 0.50 mm, where any value can be a lower and upper endpoint of a range (e.g., 0.10 mm to 0.30 mm). In another aspect, when the coating is composed of three layers of Z grade materials as depicted in FIG. 1, the coating may have a thickness of from about 0.1 mm to about 1.0 mm, or about 0.1 mm, 0.15 mm, 0.15 mm, 0.20 mm, 0.25 mm, 0.30 mm, 0.35 mm, 0.40 mm, 0.45 mm, or 0.50 mm, 0.55 mm, 0.60 mm, 0.65 mm, 0.70 mm, 0.75 mm, 0.80 mm, 0.85 mm, 0.90 mm, 0.95 mm, or 1.0 mm, where any value can be a lower and upper endpoint of a range (e.g., 0.20 mm to 0.40 mm).

The articles described herein are produced by applying one or more layers composed of Z grade materials on a substrate. In one aspect, the method of making an article described herein comprises:

- applying a first layer comprising a first Z grade material to a first surface of a substrate, wherein the first layer has a first surface;
- applying a second layer comprising a second Z grade material to the first surface of the first layer, wherein the second layer has a first surface; and
- applying a third layer comprising a third Z grade material to the first surface of the second layer, wherein, in one embodiment, the atomic number of each of the first Z grade material and the third Z grade material is less than the atomic number of the second Z grade material.

In one aspect, the first layer, second layer, and third layer are applied by plasma spray deposition, thermal spray deposition, or a combination thereof. The selection of the Z grade material can determine the technique used to apply the Z grade materials. In one aspect, if the Z grade materials have a sufficiently low melting point, the Z grade materials can be applied thermally as a liquid or molten spray or, in the alternative, applied as a solid on the substrate then subsequently melted. In another aspect, plasma spraying of the Z-grade material provides the ability to pattern or vary the thickness of the different Z-graded layers.

Novel articles described herein possess improved radiation shielding properties. As discussed above, the standard thickness of lead used for gamma radiation protection in the medical apron industry is often 0.35 mm. In one aspect, the coating shields the article from gamma radiation at least two times greater when compared to an article comprising a single layer of lead at the same thickness of the coating. In another aspect, the coating shields the article from gamma radiation from about two times to about thirty times greater, about two times, about three times, about four times, about five times, about six times, about seven times, about eight times, about nine times, about ten times, about eleven times, about twelve times, about thirteen times, about fourteen times, about fifteen times, about twenty times, about twenty five times, or about thirty times, when compared to an article comprising a single layer of lead at the same thickness, where any value can be a lower and upper endpoint of a range (e.g., about nine times to about eleven times).

Figure 3:
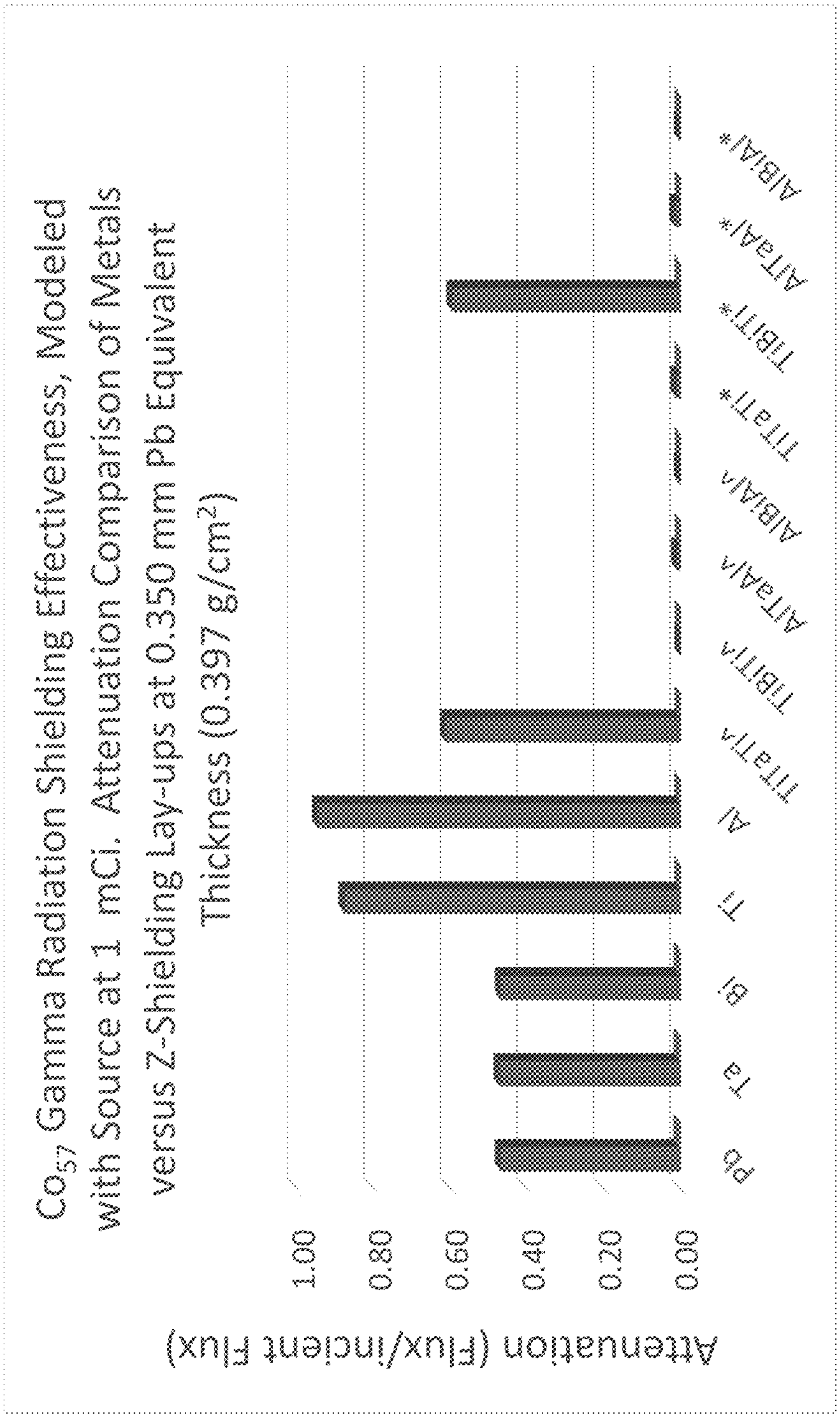
FIG. 3 shows $Co_{57}$ gamma radiation shielding effectiveness modeled with source at 1 mCi. The attenuation comparison of metals versus Z-shielding lay-ups was at 0.350 mm Pb equivalent thickness (0.397 g/cm$^2$)
Figure 4:
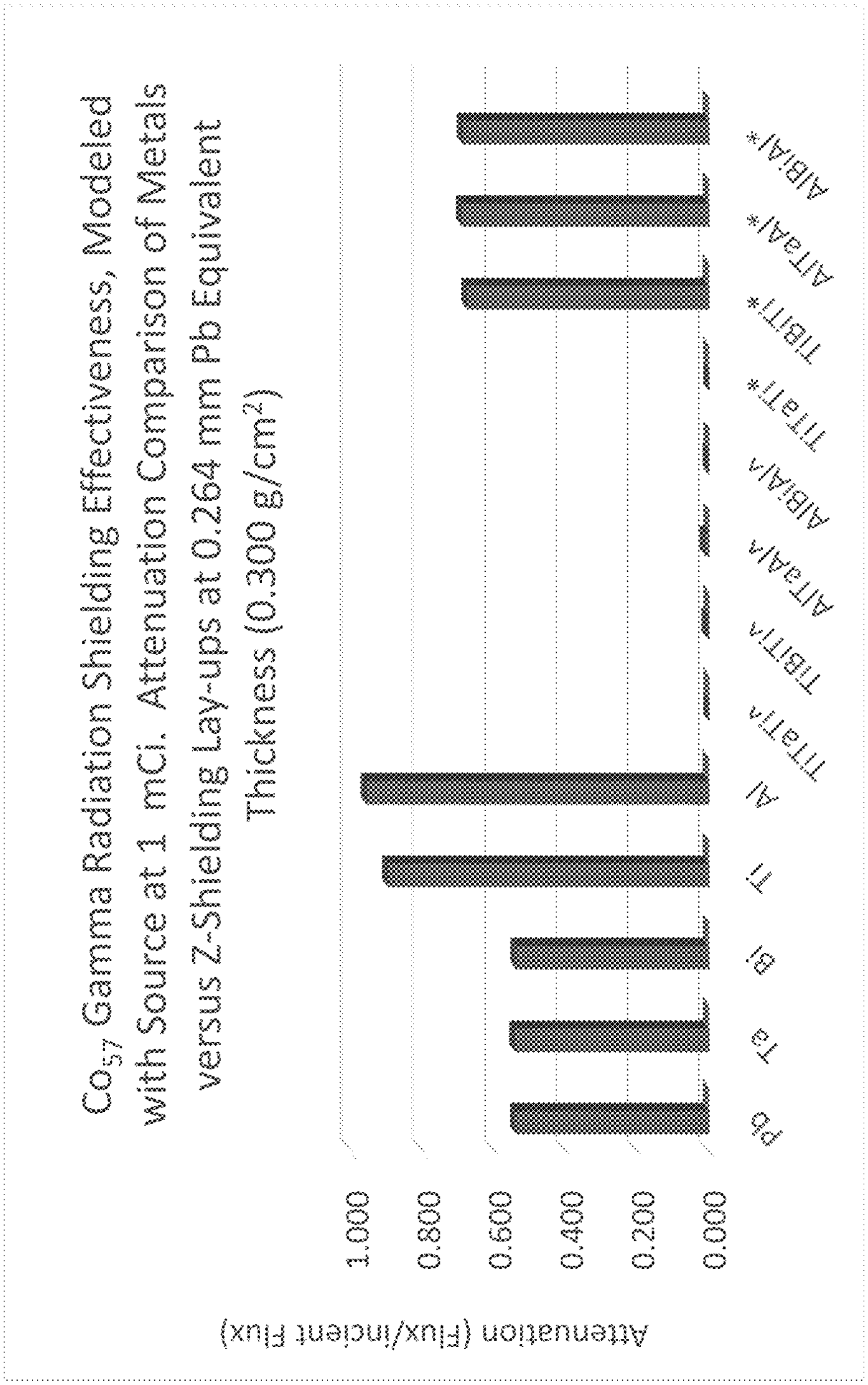
FIG. 4 shows $Co_{57}$ gamma radiation shielding effectiveness modeled with source at 1 mCi. The attenuation comparison of metals versus Z-shielding lay-ups was at 0.264 mm Pb equivalent thickness (0.300 g/cm$^2$).

FIGS. 3 and 4 demonstrate that coatings produced herein have enhanced radiation shielding. Those of ordinary skill in the art will appreciate that FIGS. 3 and 4 refer to example coatings and other coatings not falling within the scope of FIGS. 3 and/or 4 nonetheless fall within the scope of the innovation described herein. Referring to FIGS. 3 and 4, the example coatings are effective in Co57 gamma radiation shielding when compared to a single layer of lead at the same thickness of the coating, respectively. Tables and 1 and 2 below provide the data as provided in FIGS. 3 and 4, respectively.

TABLE 1

| Material | I/Io | error | areal density |
|---|---|---|---|
| Pb | 4.69E−01 | 5.E−03 | 0.397 |
| Ta | 4.72E−01 | 5.E−03 | 0.397 |
| Bi | 4.69E−01 | 5.E−03 | 0.397 |
| Ti | 8.77E−01 | 3.E−03 | 0.397 |
| Al | 9.47E−01 | 2.E−03 | 0.397 |
| TiTaTi^ | 6.139E−01 | 1.6E−03 | 0.397 |
| TiBiTi^ | 1.79E−03 | 4.E−05 | 0.397 |
| AlTaAl^ | 9.81E−03 | 1.1E−04 | 0.397 |
| AlBiAl^ | 3.03E−03 | 5.E−05 | 0.397 |
| TiTaTi* | 1.28E−02 | 1.3E−03 | 0.397 |
| TiBiTi* | 5.96E−01 | 2.E−03 | 0.397 |
| AlTaAl* | 1.53E−02 | 1.3E−03 | 0.397 |
| AlBiAl* | 2.8E−03 | 1.2E−03 | 0.397 |

^areal density (g/cm2) used:
A 0.050 g/cm2/B 0.197 g/cm2/A 0.15 g/cm2 for the three layers in the modeled materials
*areal density (g/cm2) used:
A 0.075 g/cm2/B 0.197 g/cm2/A 0.075 g/cm2 for the three layers in the modeled materials
A = low Z (Al or Ti),
B = High Z (Ta or Bi)
I = flux behind shielding
Io = incident flux
I/Io = attenuation
Total Incident Co57 Gamma radiation is composed of the following energies and fluxes:
1.400000E−02 MeV 3.529412E+06 flux
1.220000E−01 MeV 3.166852E+07 flux
1.360000E−01 MeV 3.921569E+06 flux
6.920000E−01 Mev 7.399186E+03 flux

TABLE 2

| Material | I/Io | error | areal density |
|---|---|---|---|
| Pb | 5.42E−01 | 2.E−03 | 0.300 |
| Ta | 5.42E−01 | 2.E−03 | 0.300 |
| Bi | 5.41E−01 | 2.E−03 | 0.300 |
| Ti | 8.99E−01 | 2.E−03 | 0.300 |

TABLE 2-continued

| Material | I/Io | error | areal density |
|---|---|---|---|
| Al | 9.58E−01 | 2.E−03 | 0.300 |
| TiTaTi^ | 8.8E−05 | 9.E−06 | 0.300 |
| TiBiTi^ | 5.21E−03 | 6.E−05 | 0.300 |
| AlTaAl^ | 9.81E−03 | 1.1E−04 | 0.300 |
| AlBiAl^ | 2.46E−03 | 4.E−05 | 0.300 |
| TiTaTi* | 2.E−04 | 1.2E−03 | 0.300 |
| TiBiTi* | 6.77E−01 | 2.E−03 | 0.300 |
| AlTaAl* | 6.93E−01 | 2.E−03 | 0.300 |
| AlBiAl* | 6.90E−01 | 2.E−03 | 0.300 |

^areal density (g/cm2) used:
A 0.050 g/cm2/B 0.150 g/cm2/A 0.100 g/cm2 for the three layers in the modeled materials
*areal density (g/cm2) used:
A 0.075 g/cm2/B 0.150 g/cm2/A 0.075 g/cm2 for the three layers in the modeled materials
A = low Z (Al or Ti),
B = High Z (Ta or Bi)
I = flux behind shielding
Io = incident flux
I/Io = attenuation
Total Incident Co57 Gamma radiation is composed of the following energies and fluxes:
1.400000E−02 MeV 3.529412E+06 flux
1.220000E−01 MeV 3.166852E+07 flux
1.360000E−01 MeV 3.921569E+06 flux
6.920000E−01 Mev 7.399186E+03 flux In addition to having improved radiation shielding properties, coatings described herein have desirable physical properties. For example, coating compositions described herein are less dense than lead at the same thickness. The reduced weight of the coatings is useful in applications where the weight of the coated article is an important consideration (e.g., space travel, use on pediatric patients undergoing medical examinations). In one aspect, the coating has a mass that is at least 10% less than a single layer of lead at the same thickness. In another aspect, the coating has a mass that is from about 10% to about 50% less than a coating of lead at the same thickness of the coating, or from about 10%, 15%, 20%, 25%, 30%, 35%, 40%, 45%, or 50%, where any value can be a lower and upper endpoint of a range (e.g., 20% to 40%).

ASPECTS

Example Aspect 1. An article for shielding radiation, the article comprising (a) a substrate having a first surface and a coating comprising;

(b) a first layer comprising a first Z grade material adjacent to the first surface of the substrate, wherein the first layer has a first surface;

(c) a second layer comprising a second Z grade material adjacent to the first surface of the first layer, wherein the second layer has a first surface; and (d) a third layer comprising a third Z grade material adjacent to the first surface of the second layer, wherein the atomic number of the first Z grade material and the third Z grade material is less than the atomic number of the second Z grade material.

Example Aspect 2. The article of Aspect 1, wherein the first Z grade material and the third Z grade material thereof are the same material.

Example Aspect 3. The article of Aspect 1, wherein the first Z grade material and the third Z grade material are different materials.

Example Aspect 4. The article of any one of Aspects 1-3, wherein the first Z grade material and the third Z grade material comprise (i) aluminum, titanium, copper, vanadium, steel, tin, antimony, or any combination thereof or (ii) an alloy of aluminum, an alloy of titanium, an alloy of vanadium, an alloy of steel, an alloy of tin, or an alloy of antimony.

Example Aspect 5. The article of any one of Aspects 1-3, wherein the first Z grade material and the third Z grade material comprises titanium.

Example Aspect 6. The article of any one of Aspects 1-5, wherein the second Z grade material comprises (i) tantalum, bismuth, tungsten, tin, lead, or any combination thereof or (ii) an alloy of tantalum, an alloy of bismuth, an alloy of tungsten, or an alloy of lead.

Example Aspect 7. The article of any one of Aspects 1-5, wherein the second Z grade material comprises tantalum.

Example Aspect 8. The article of any one of Aspects 1-5, wherein the second Z grade material comprises bismuth or a bismuth tin alloy.

Example Aspect 9. The article of Aspect 1, wherein the first Z grade material and the third Z grade material comprises titanium and the second Z grade material comprises tantalum or bismuth.

Example Aspect 10. The article of any one of Aspects 1-9, wherein the first layer, second layer, and third layer independently have a thickness of from about 0.05 mm to about 0.5 mm.

Example Aspect 11. The article of any one of Aspects 1-9, wherein the coating has a thickness of from about 0.1 mm to about 1.0 mm.

Example Aspect 12. The article of any one of Aspects 1-11, wherein the coating shields the article from gamma radiation at least two times greater when compared to an article comprising a single layer of lead at the same thickness as the coating.

Example Aspect 13. The article of any one of Aspects 1-11, wherein the coating shields the article from gamma radiation from two times to thirty times greater when compared to an article comprising a single layer of lead at the same thickness as the coating.

Example Aspect 14. The article of any one of Aspects 1-13, wherein the coating has a mass that is at least at least 10% less than an article comprising a coating of lead at the same thickness as the coating.

Example Aspect 15. The article of any one of Aspects 1-13, wherein the coating has a mass that is from about 10% to about 50% less than an article comprising a coating of lead at the same thickness as the coating.

Example Aspect 16. The article of any one of Aspects 1-15, wherein the substrate comprises a textile.

Example Aspect 17. The article of Aspect 16, wherein the textile comprises a woven or non-woven material.

Example Aspect 18. The article of Aspect 16, wherein the textile comprises a nylon, a polyethylene, a polyester, or cotton.

Example Aspect 19. A method for making article for shielding radiation, the method comprising (a) applying a first layer comprising a first Z grade material to a first surface of a substrate, wherein the first layer has a first surface;

(b) applying a second layer comprising a second Z grade material to the first surface of the first layer, wherein the second layer has a first surface; and (c) applying a third layer comprising a third Z grade material to the first surface of the second layer, wherein the atomic number of the first Z grade material and the third Z grade material is less than the atomic number of the second Z grade material.

Example Aspect 20. The method of Aspect 19, wherein the first layer, second layer, and third layer are applied by plasma spray deposition, thermal spray deposition, or a combination thereof.

Example Aspect 21. An article for shielding radiation, the article comprising (a) a first substrate having a first surface;

(b) a first layer comprising a first Z grade material adjacent to the first surface of the first substrate, wherein the first layer has a first surface;

(c) a second substrate adjacent to the first surface of the first layer, wherein the second substrate has a first surface;

(d) a second layer comprising a second Z grade material adjacent to the first surface of the second substrate, wherein the second layer has a first surface;

(e) a third substrate adjacent to the first surface of the second layer, wherein the third substrate has a first surface; and (f) a third layer comprising a third Z grade material adjacent to the first surface of the third substrate, wherein the atomic number of the first Z grade material and the third Z grade material is less than the atomic number of the second Z grade material.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. An article for shielding radiation, the article having an areal density of up to about 0.397 g/cm$^2$ and comprising a substrate having a first surface and a coating comprising:

a first layer comprising a first Z grade material adjacent to the first surface of the substrate, wherein the first layer has a first surface;

a second layer comprising a second Z grade material adjacent to the first surface of the first layer, wherein the second layer has a first surface; and a third layer comprising a third Z grade material adjacent to the first surface of the second layer, wherein the atomic number of each of the first Z grade material and the third Z grade material are less than the atomic number of the second Z grade material.

2. The article of claim 1, wherein the first Z grade material and the third Z grade material thereof are the same material.

3. The article of claim 1, wherein the first Z grade material and the third Z grade material are different materials.

4. The article of claim 1, wherein each of the first Z grade material and the third Z grade material comprise (i) aluminum, titanium, copper, vanadium, steel, tin, antimony, or any combination thereof or (ii) an alloy of aluminum, an alloy of titanium, an alloy of vanadium, an alloy of steel, an alloy of tin, or an alloy of antimony.

5. The article of claim 1, wherein the first Z grade material and the third Z grade material each comprise titanium.

6. The article of claim 1, wherein the second Z grade material comprises (i) tantalum, bismuth, tungsten, lead, or any combination thereof or (ii) an alloy of tantalum, an alloy of bismuth, an alloy of tungsten, or an alloy of lead.

7. The article of claim 1, wherein the second Z grade material comprises tantalum.

8. The article of claim 1, wherein the second Z grade material comprises bismuth or a bismuth tin alloy.

9. The article of claim 1, wherein both of the first Z grade material and the third Z grade material comprise titanium, and wherein the second Z grade material comprises tantalum or bismuth.

10. The article of claim 1, wherein the first layer, second layer, and third layer independently have a thickness of from about 0.05 mm to about 0.5 mm.

11. The article of claim 1, wherein the coating shields the article from gamma radiation at least two times greater when compared to an article comprising a single layer of lead at the same thickness as the coating.

12. The article of claim 1, wherein the coating shields the article from gamma radiation from two times to thirty times greater when compared to an article comprising a single layer of lead at the same thickness as the coating.

13. The article of claim 1, wherein the coating has a mass that is at least at least 10% less than an article comprising a coating of lead at the same thickness as the coating.

14. The article of claim 1, wherein the coating has a mass that is from about 10% to about 50% less than an article comprising a coating of lead at the same thickness as the coating.

15. The article of claim 1, wherein the substrate comprises a textile.

16. The article of claim 15, wherein the textile comprises a woven or non-woven material.

17. The article of claim 15, wherein the textile comprises a nylon, a polyethylene, a polyester, or cotton.

18. A method for making article for shielding radiation, the method comprising:

applying a first layer comprising a first Z grade material to a first surface of a substrate, wherein the first layer has a first surface;

applying a second layer comprising a second Z grade material to the first surface of the first layer, wherein the second layer has a first surface; and applying a third layer comprising a third Z grade material to the first surface of the second layer, wherein the atomic number of each of the first Z grade material and the third Z grade material is less than the atomic number of the second Z grade material and the article has an areal density of up to about 0.397 g/cm$^2$.

19. The method of claim 18, wherein the first layer, second layer, and third layer are applied by plasma spray deposition, thermal spray deposition, or a combination thereof.

20. An article for shielding radiation, the article having an areal density of up to about 0.397 g/cm$^2$ and comprising a first substrate having a first surface;

a first layer comprising a first Z grade material adjacent to the first surface of the first substrate, wherein the first layer has a first surface;

a second substrate adjacent to the first surface of the first layer, wherein the second substrate has a first surface;

a second layer comprising a second Z grade material adjacent to the first surface of the second substrate, wherein the second layer has a first surface;

a third substrate adjacent to the first surface of the second layer, wherein the third substrate has a first surface; and a third layer comprising a third Z grade material adjacent to the first surface of the third substrate, wherein the atomic number of each the first Z grade material and the third Z grade material is less than the atomic number of the second Z grade material.

* * * * *